United States Patent
Zong et al.

(10) Patent No.: US 11,610,114 B2
(45) Date of Patent: Mar. 21, 2023

(54) METHOD FOR SUPERVISED GRAPH SPARSIFICATION

(71) Applicant: NEC Laboratories America, Inc., Princeton, NJ (US)

(72) Inventors: Bo Zong, West Windsor, NJ (US); Jingchao Ni, Princeton, NJ (US); Haifeng Chen, West Windsor, NJ (US); Cheng Zheng, Los Angeles, CA (US)

(73) Assignee: NEC Corporation

( * ) Notice: Subject to any disclaimer, the term of this patent is extended or adjusted under 35 U.S.C. 154(b) by 696 days.

(21) Appl. No.: 16/675,596

(22) Filed: Nov. 6, 2019

(65) Prior Publication Data
US 2020/0151563 A1    May 14, 2020

Related U.S. Application Data

(60) Provisional application No. 62/799,130, filed on Jan. 31, 2019, provisional application No. 62/757,204, filed on Nov. 8, 2018.

(51) Int. Cl.
  *G06N 3/08*  (2006.01)
  *G06N 3/04*  (2006.01)

(52) U.S. Cl.
  CPC ............. *G06N 3/08* (2013.01); *G06N 3/0445* (2013.01)

(58) Field of Classification Search
  CPC .............................. G06N 3/08; G06N 3/0445
  See application file for complete search history.

(56) References Cited

U.S. PATENT DOCUMENTS

| | | |
|---|---|---|
| 8,341,095 B2 | 12/2012 | Bai et al. |
| 8,724,911 B2 | 5/2014 | Saund |
| 8,873,844 B2 | 10/2014 | Huang et al. |
| 9,208,257 B2 | 12/2015 | Milenova et al. |
| 9,633,306 B2 | 4/2017 | Liu et al. |
| 9,727,532 B2 | 8/2017 | Perronnin et al. |
| 2011/0314367 A1 | 12/2011 | Chang et al. |

(Continued)

OTHER PUBLICATIONS

Lindner et al., "Structure-Preserving Sparsification of Social Networks"2015 IEEE/ACM international conference on Advances in Social Networks Analysis and Mining (ASONAM). IEEE, 2015. (Year: 2015).*

*Primary Examiner* — Bhavesh M Mehta
*Assistant Examiner* — Edward Tracy, Jr.
(74) *Attorney, Agent, or Firm* — Joseph Kolodka

(57) ABSTRACT

A method for employing a supervised graph sparsification (SGS) network to use feedback from subsequent graph learning tasks to guide graph sparsification is presented. The method includes, in a training phase, generating sparsified subgraphs by edge sampling from input training graphs following a learned distribution, feeding the sparsified subgraphs to a prediction/classification component, collecting a predication/classification error, and updating parameters of the learned distribution based on a gradient derived from the predication/classification error. The method further includes, in a testing phase, generating sparsified subgraphs by edge sampling from input testing graphs following the learned distribution, feeding the sparsified subgraphs to the prediction/classification component, and outputting prediction/classification results to a visualization device.

15 Claims, 11 Drawing Sheets

Procedure of SGS

(56) References Cited

U.S. PATENT DOCUMENTS

| | | | |
|---|---|---|---|
| 2012/0278261 A1* | 11/2012 | Lin | G06N 5/003 |
| | | | 707/690 |
| 2016/0070810 A1* | 3/2016 | Aggarwal | G06F 16/954 |
| | | | 707/776 |
| 2019/0251480 A1* | 8/2019 | Garcia | G06N 20/00 |
| 2020/0401916 A1* | 12/2020 | Rolfe | G06N 10/60 |

* cited by examiner

Edge Sampling Probabilities

Importance of Edge

$$z_{u,v} = MLP_\theta(x_u, x_v, e_{u,v})$$

Probability that Edge is Sampled

$$\pi_{u,v} = \frac{\exp(z_{u,v})}{\sum_{w \in N_u} \exp(z_{u,w})}$$

Sparse Vector Indicating Sampled Edge

$$S_v = \frac{\exp((\log(\pi_{u,v}) + \varepsilon_v)/\tau)}{\sum_{w \in N_u} \exp((\log(\pi_{u,w}) + \varepsilon_w)/\tau)}$$

FIG. 11

METHOD FOR SUPERVISED GRAPH SPARSIFICATION

RELATED APPLICATION INFORMATION

This application claims priority to Provisional Application No. 62/757,204, filed on Nov. 8, 2018, and Provisional Application No. 62/799,130, filed on Jan. 31, 2019, the contents of which are incorporated herein by reference in their entirety.

BACKGROUND

Technical Field

The present invention relates to graph sparsification and, more particularly, to methods and systems for supervised graph sparsification where feedback is utilized from subsequent graph learning tasks to guide graph sparsification.

Description of the Related Art

A graph is a data structure for representing relational information in real-life applications. In practice, graph data are usually large with millions of nodes and billions of edges. The large size of graphs challenges graph learning methods with regard to overfitting risk, visualization difficulty, and scalability. As large graphs are usually noisy, a subset of nodes and edges from original graphs could be sufficient enough for real-life applications. Graph sparsification is a data reduction operation that extracts a subset of nodes and edges from the original large size graph. The resulting sparse subgraph helps users visualize, explore, digest, and interpret data. Moreover, graph sparsification also helps in reducing noise in the data and in avoiding model overfitting in machine learning based applications.

SUMMARY

A computer-implemented method for employing a supervised graph sparsification (SGS) network to use feedback from subsequent graph learning tasks to guide graph sparsification is presented. The method includes, in a training phase, generating sparsified subgraphs by edge sampling from input training graphs following a learned distribution, feeding the sparsified subgraphs to a prediction/classification component, collecting a predication/classification error, and updating parameters of the learned distribution based on a gradient derived from the predication/classification error. The method further includes, in a testing phase, generating sparsified subgraphs by edge sampling from input testing graphs following the learned distribution, feeding the sparsified subgraphs to the prediction/classification component, and outputting prediction/classification results to a visualization device.

A non-transitory computer-readable storage medium comprising a computer-readable program is presented for employing a supervised graph sparsification (SGS) network to use feedback from subsequent graph learning tasks to guide graph sparsification, wherein the computer-readable program when executed on a computer causes the computer to perform the steps of, in a training phase, generating sparsified subgraphs by edge sampling from input training graphs following a learned distribution, feeding the sparsified subgraphs to a prediction/classification component, collecting a predication/classification error, and updating parameters of the learned distribution based on a gradient derived from the predication/classification error. The computer-readable program when executed on a computer causes the computer to perform the steps of, in a testing phase, generating sparsified subgraphs by edge sampling from input testing graphs following the learned distribution, feeding the sparsified subgraphs to the prediction/classification component, and outputting prediction/classification results to a visualization device.

A system for employing a supervised graph sparsification (SGS) network to use feedback from subsequent graph learning tasks to guide graph sparsification is presented. The system includes a memory and one or more processors in communication with the memory configured to, in a training phase, generate sparsified subgraphs by edge sampling from input training graphs following a learned distribution, feed the sparsified subgraphs to a prediction/classification component, collect a predication/classification error, and update parameters of the learned distribution based on a gradient derived from the predication/classification error, and, in a testing phase, generate sparsified subgraphs by edge sampling from input testing graphs following the learned distribution, feed the sparsified subgraphs to the prediction/classification component, and output prediction/classification results to a visualization device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 11 is a block/flow diagram of exemplary equations employed in an exemplary method for supervised graph sparsification where feedback is utilized from subsequent graph learning tasks to guide graph sparsification, in accordance with embodiments of the present invention.

DETAILED DESCRIPTION OF PREFERRED EMBODIMENTS

Graph representation learning serves as the core of many prediction tasks, ranging from product recommendation in online marketing to fraud detection in the financial domain. Real-life graphs are usually large with a complex local neighborhood, where each node is described by a rich set of features and easily connects to dozens or even hundreds of neighbors. Most existing graph learning techniques rely on neighborhood aggregation, however, the complexity of real-life graphs is usually high, thus posing non-trivial overfitting risks during model training.

The exemplary embodiments of the present invention identify Supervised Graph Sparsification (SGS) by which a user can directly utilize the feedback from subsequent graph learning tasks to guide graph sparsification. First, SGS sparsified graphs are sampled by sampling edges from individual nodes following a learned distribution. Second, by employing a Gumbel-Softmax technique, edges are sampled from SGS and are differentiable. Third, when subsequent prediction or classification tasks take the sparsified subgraphs as input, the exemplary method can train the underlying distribution that governs edge sampling from the prediction/classification error by, e.g., employing standard gradient descent algorithms.

SGS is a general framework that learns an optimal method to sparsify graphs for subsequent prediction/classification tasks. In one example, suppose a user wants to sparsify original graphs for a prediction/classification task A. SGS includes the following training and testing phases.

In the training phase, the following steps are repeated until parameters converge: generate sparsified subgraphs by edge sampling from input training graphs following currently learned distribution, feed the sparsified subgraphs to task A, collect the prediction/classification error, and update the parameters of the distribution used in the first step based on the gradient derived from the prediction/classification error.

In the testing phase, SGS generates sparsified subgraphs by edge sampling from input testing graphs following the learned distribution and feeds the sparsified subgraphs to task A.

The exemplary embodiments of the present invention further identify a Neural Sparsification (NeuralSparse) network, including a supervised graph sparsification technique that mitigates the overfitting risk by reducing the complexity of input graphs. The method takes both structural and non-structural information as input, utilizes deep neural networks to parameterize the sparsification process, and optimizes the parameters by feedback signals from downstream tasks. Under the NeuralSparse framework, supervised graph sparsification could seamlessly connect with existing graph neural networks for more robust performance on testing data.

Figure 1:
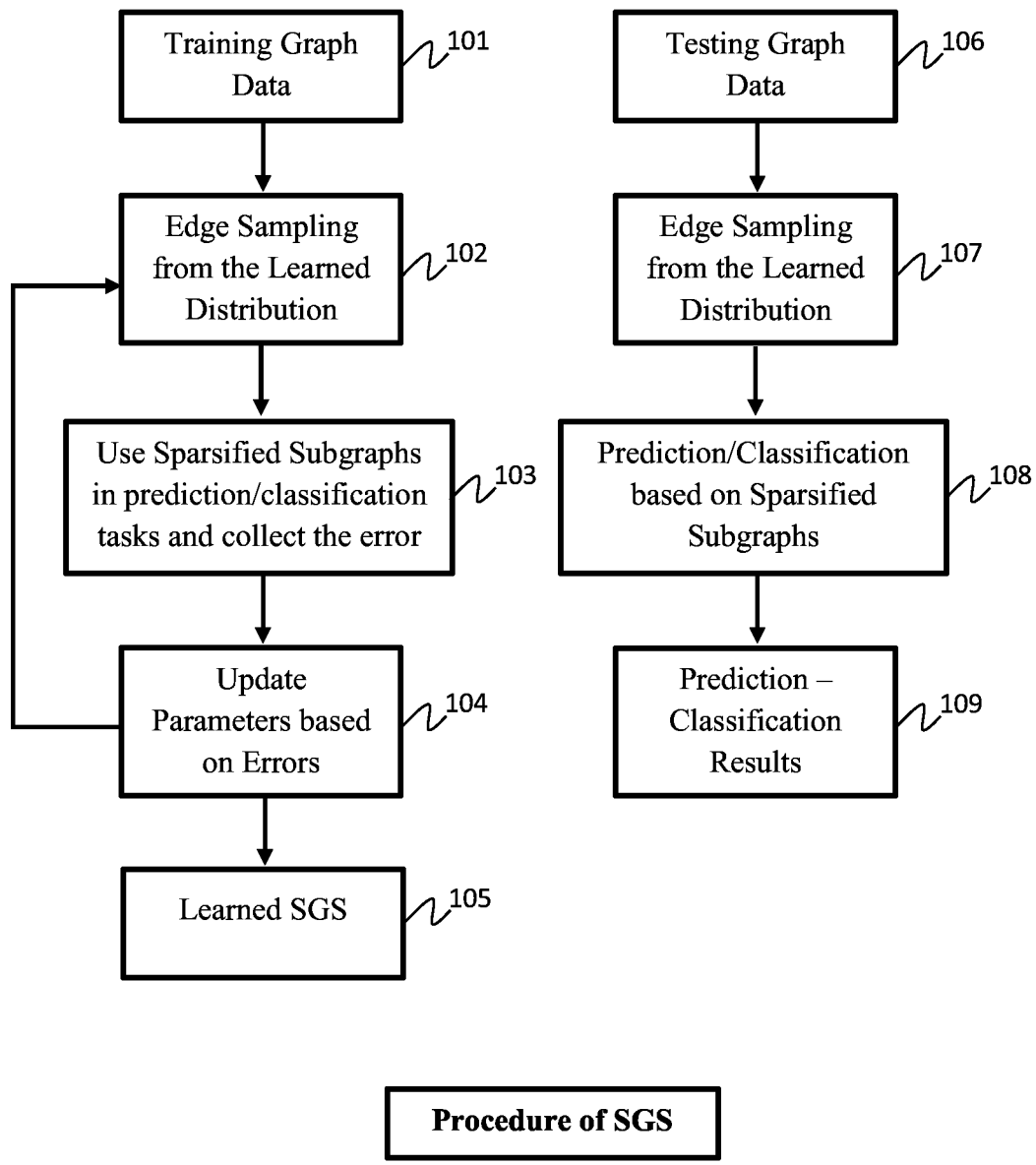
FIG. 1 is a block/flow diagram of an exemplary procedure for Supervised Graph Sparsification (SGS), in accordance with embodiments of the present invention.

FIG. 1 is a block/flow diagram of an exemplary procedure for Supervised Graph Sparsification (SGS), in accordance with embodiments of the present invention.

At block 101, regarding training graph data, the graph data used for training SGS are referred to as training graph data. Training graph data include graph data and prediction/classification ground truth data.

Figure 2:
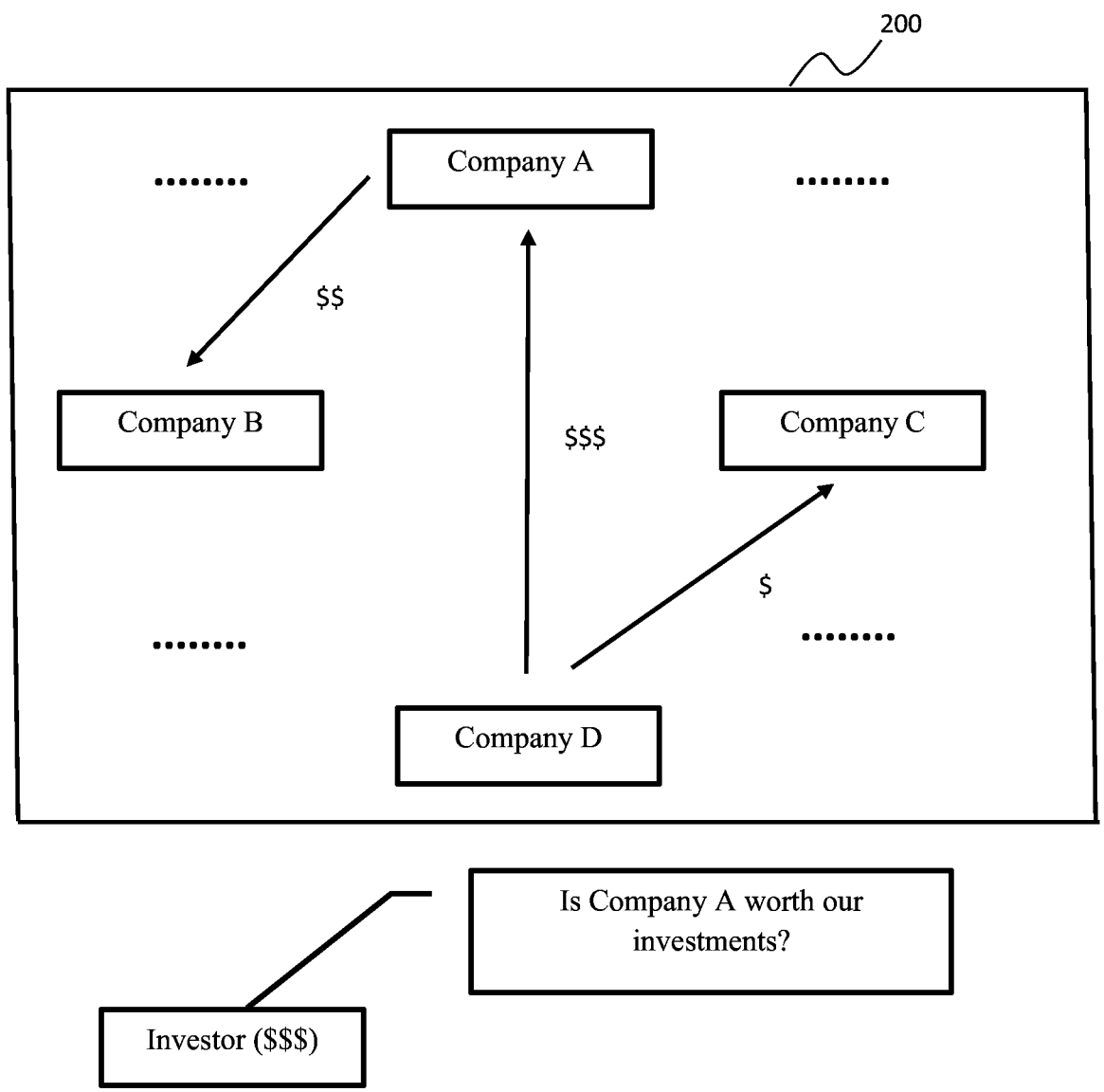
FIG. 2 is a block/flow diagram of an exemplary classification task on a financial graph, in accordance with embodiments of the present invention.

Graph data includes a set of nodes and a set of edges between the nodes. FIG. 2 described below illustrates an example of graph data in the financial domain, where nodes represent companies and edges indicate transactions between companies.

Prediction/classification ground truth data is used to collect classification errors and optimize parameters in SGS. For instance, FIG. 2 deals with a classification problem. Given the graph regarding the transactions between companies, an investor wants to predict which companies are promising for future investment. In this case, ground truth data could be company A and B are labeled as "promising," but companies C and D are labeled as "unpromising."

At block 102, regarding edge sampling in training, SGS sparsifies an input graph by repeatedly sampling edges for individual nodes. The sampling process is governed by a categorical distribution with parameter θ.

At block 103, regarding error and feedback collection, with the sparsified subgraph, a concrete prediction/classification task is employed, such as the classification problem shown in FIG. 2, to measure the error caused by this sparsified subgraph.

At block 104, regarding updating parameters, the method makes use of the feedback from block 103 to update parameter θ used for edge sampling in block 102.

At block 105, regarding learned SGS, after the training process is complete, the method obtains a learned SGS, which can perform graph sparsification on unseen data in the testing phase.

At block 106, regarding testing graph data, the method adopts the same approach used in block 102 to build a temporal graph for testing data.

At block 107, regarding edge sampling in testing, SGS sparsifies an input testing graph by edge sampling from the learned categorical distribution with θ.

At block 108, regarding prediction/classification using sparsified subgraphs, prediction or classification tasks directly take sparsified subgraphs as input, and make decisions based on their own logic.

At block 109, regarding prediction/classification results, the prediction or classification results along with any possible visualization are presented to end users.

FIG. 2 is a block/flow diagram of an exemplary classification task on a financial graph 200, in accordance with embodiments of the present invention.

In a financial domain, investors are eager to know which companies are promising for investment. In particular, investors expect a list of recommended companies, inferred based on companies' historical transaction records. As shown in FIG. 2, companies and their historical transaction records naturally form a temporal graph, shown as a graph snapshot. Each graph snapshot encodes companies' transaction data within a given time period, where nodes are companies and edges indicate transactions between companies. Note that side information of companies (e.g., industries) and transactions (e.g., transaction amount) can be represented by node attributes and edge attributes, respectively. In this task, a temporal graph of companies is provided with their transaction history and the goal is to predict companies' labels as "unpromising" or "promising" for future investment.

Figure 3:
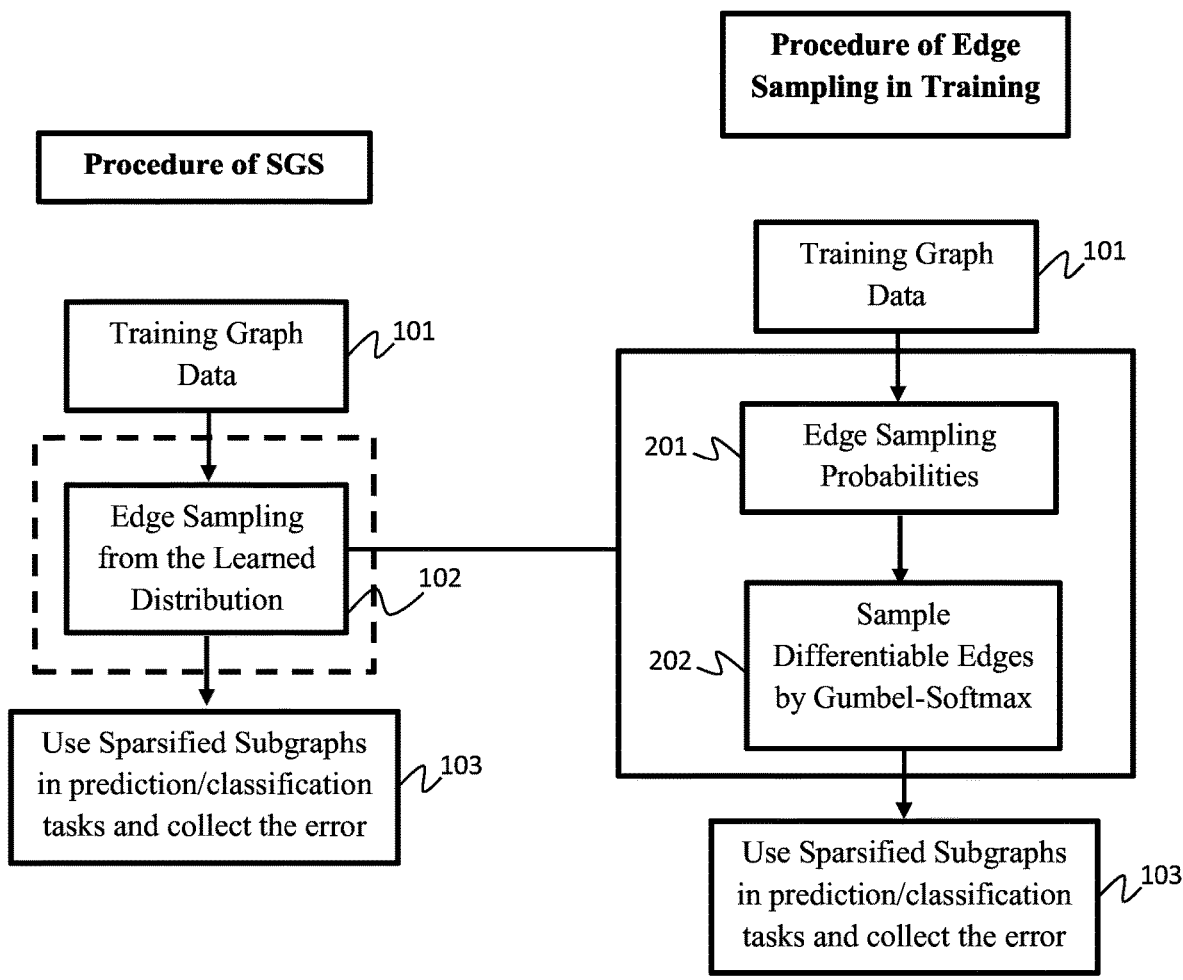
FIG. 3 is a block/flow diagram of an exemplary procedure for edge sampling in training, in accordance with embodiments of the present invention.

FIG. 3 is a block/flow diagram of an exemplary procedure for edge sampling in training, in accordance with embodiments of the present invention.

At block 201, regarding edge sampling probabilities, let u be a node in the original graph and Nu be its one-hop neighborhood.

For node v∈Nu, the importance of edge (u, v) is computed as:

$$z_{u,v} = MLP_\theta(x_u, x_v, e_{u,v}),$$

where $z_{u,v}$ is a scalar indicating the importance of edge (u, v), $x_u$ is a vector representation of u's attributes, $x_v$ is a vector representation of v's attributes, $e_{u,v}$ is a vector representation of edge attributes, and $MLP_\theta(\ )$ is a multi-layer neural network parameterized by θ.

With the importance, the method can further derive the probability that edge (u, v) will be sampled as:

$$\pi_{u,v} = \frac{\exp(z_{u,v})}{\sum_{w \in N_u} \exp(z_{u,w})}$$

At block 202, regarding sample differentiable edges by Gumbel-Softmax, without loss of generality, the method focuses on edge sampling of node u.

Edge sampling is performed as follows:

For any node v∈Nu, the method samples $\varepsilon_v = -\log(-\log(q))$, where q is randomly sampled from U[0, 1] (e.g., uniform distribution between 0 and 1).

For any node v∈Nu, the method obtains:

$$s_v = \frac{\exp((\log(\pi_{u,v}) + \varepsilon_v)/\tau)}{\sum_{w \in N_u} \exp((\log(\pi_{u,w}) + \varepsilon_w)/\tau)}$$

where τ is a constant, and $s_v$ is expected to be either close to 0 or 1 with $\Sigma_{v \in N_u} s_v = 1$.

The sparse vector formed by $s_v$ indicates the sampled edge.

The above steps are repeated k times, where k is a hyper-parameter predefined by users. The above sampling process is repeatedly performed over all the nodes in the original input graph.

After block 202, the method obtains a sparsified subgraph from the original graph.

Figure 4:
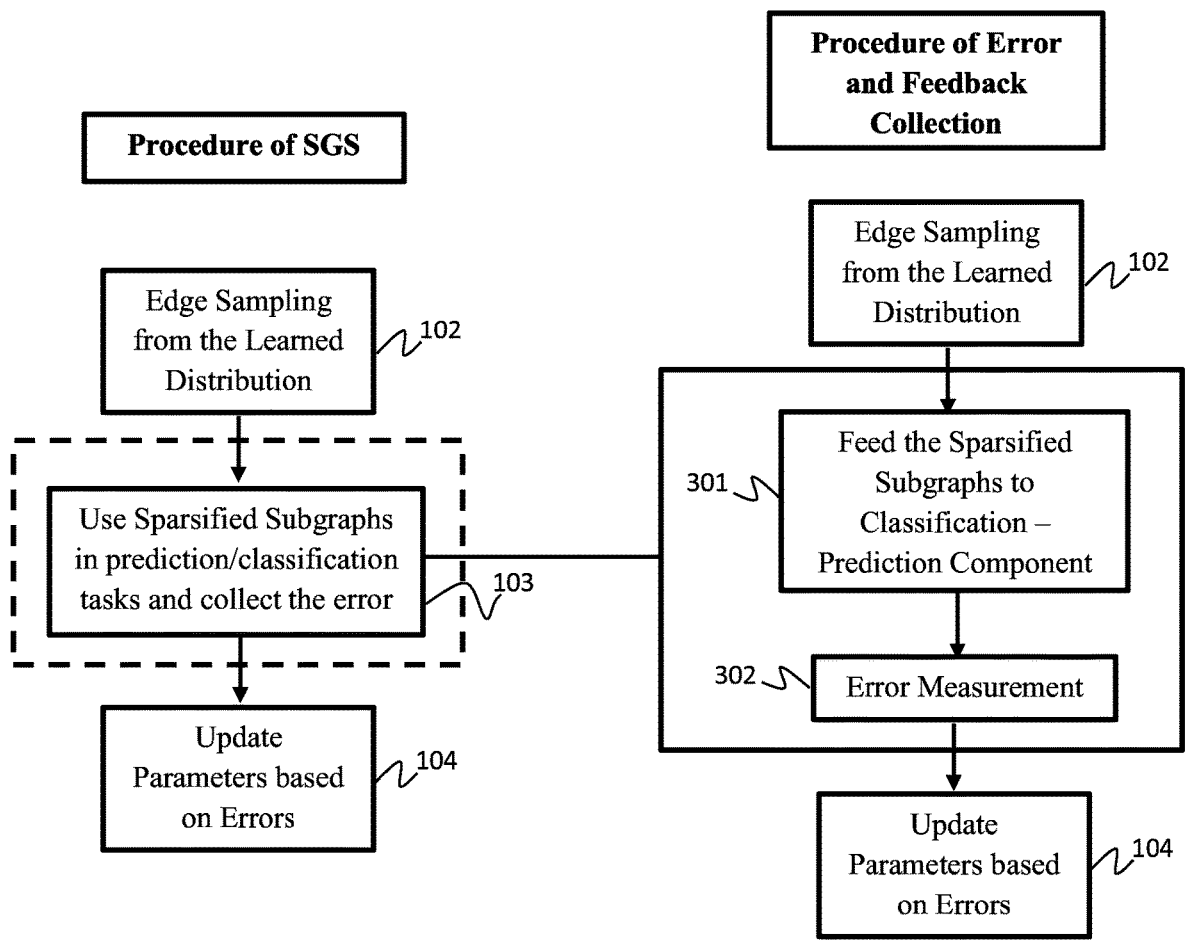
FIG. 4 is a block/flow diagram of an exemplary procedure for error and feedback collection, in accordance with embodiments of the present invention.

FIG. 4 is a block/flow diagram of an exemplary procedure for error and feedback collection, in accordance with embodiments of the present invention.

At block 301, the sparsified subgraphs are fed to a classification/prediction component. Here the exemplary method assumes a trained neural network is ready to use for the target prediction/classification task. Instead of working on original input graphs, this component takes the sparsified subgraphs from block 102 as input, and produces prediction/classification results.

At block 302, regarding error measurement, given the ground truth in the training data and the produced prediction/classification results from block 301, the method can utilize a standard error function, such as a mean square error for numerical value prediction or cross entropy for categorical classification, to produce the loss/error caused by the sparsified subgraph.

Figure 5:
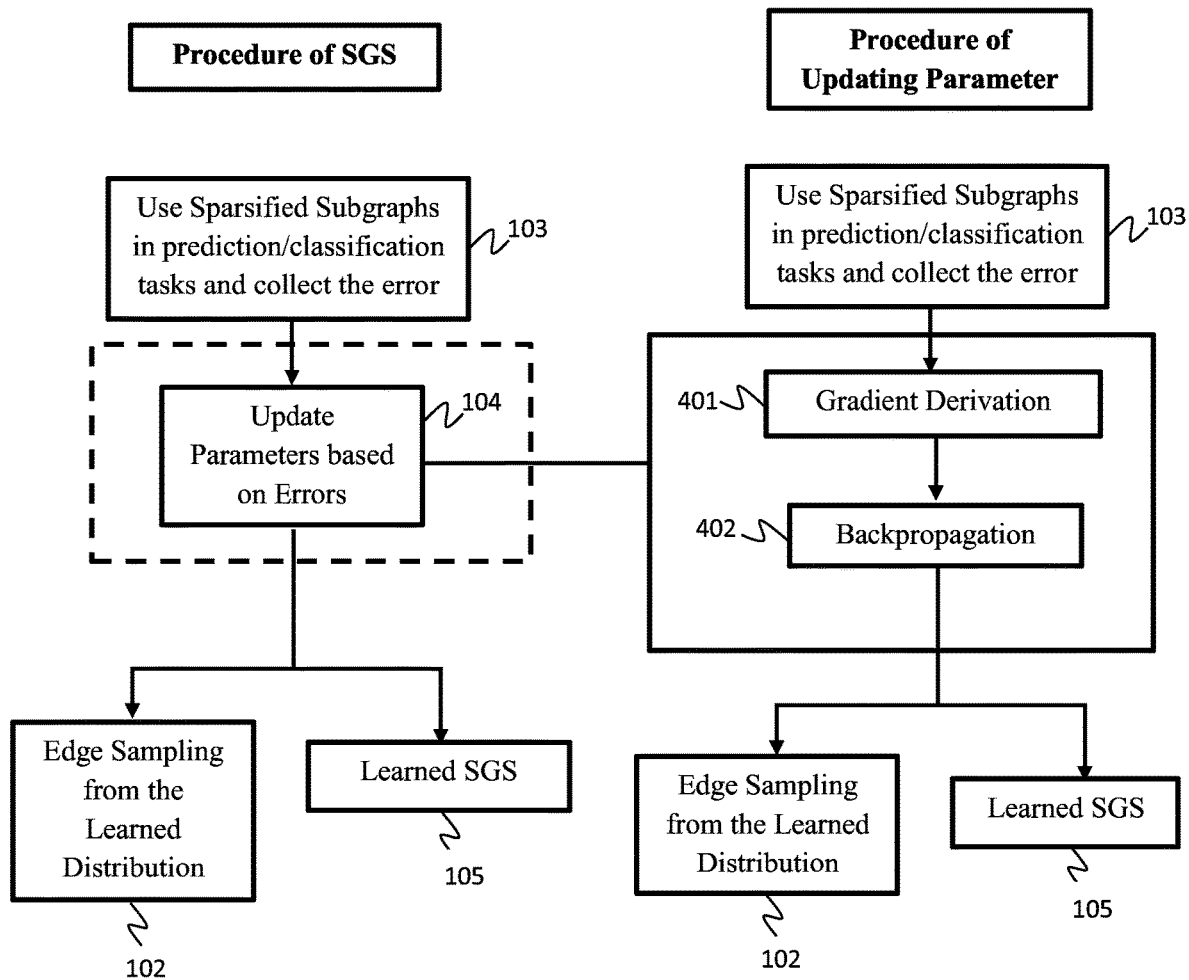
FIG. 5 is a block/flow diagram of an exemplary procedure for updating parameters, in accordance with embodiments of the present invention.

FIG. 5 is a block/flow diagram of an exemplary procedure for updating parameters, in accordance with embodiments of the present invention.

At block 401, regarding gradient derivation, as the sparsified subgraphs are differentiable, the exemplary method can derive the gradient of θ with respect to the error produced in block 103. In particular, the method can employ the chain rule from neural networks to derive the gradients of θ.

At block 402, regarding backpropagation, with the defined gradient of θ with respect to the error, the exemplary method can update θ by employing a standard backpropagation algorithm for neural networks.

Note that blocks 102, 103, and 104 are performed iteratively until θ converges or certain stop criteria are met. After that, the work flow proceeds to block 105.

Figure 6:
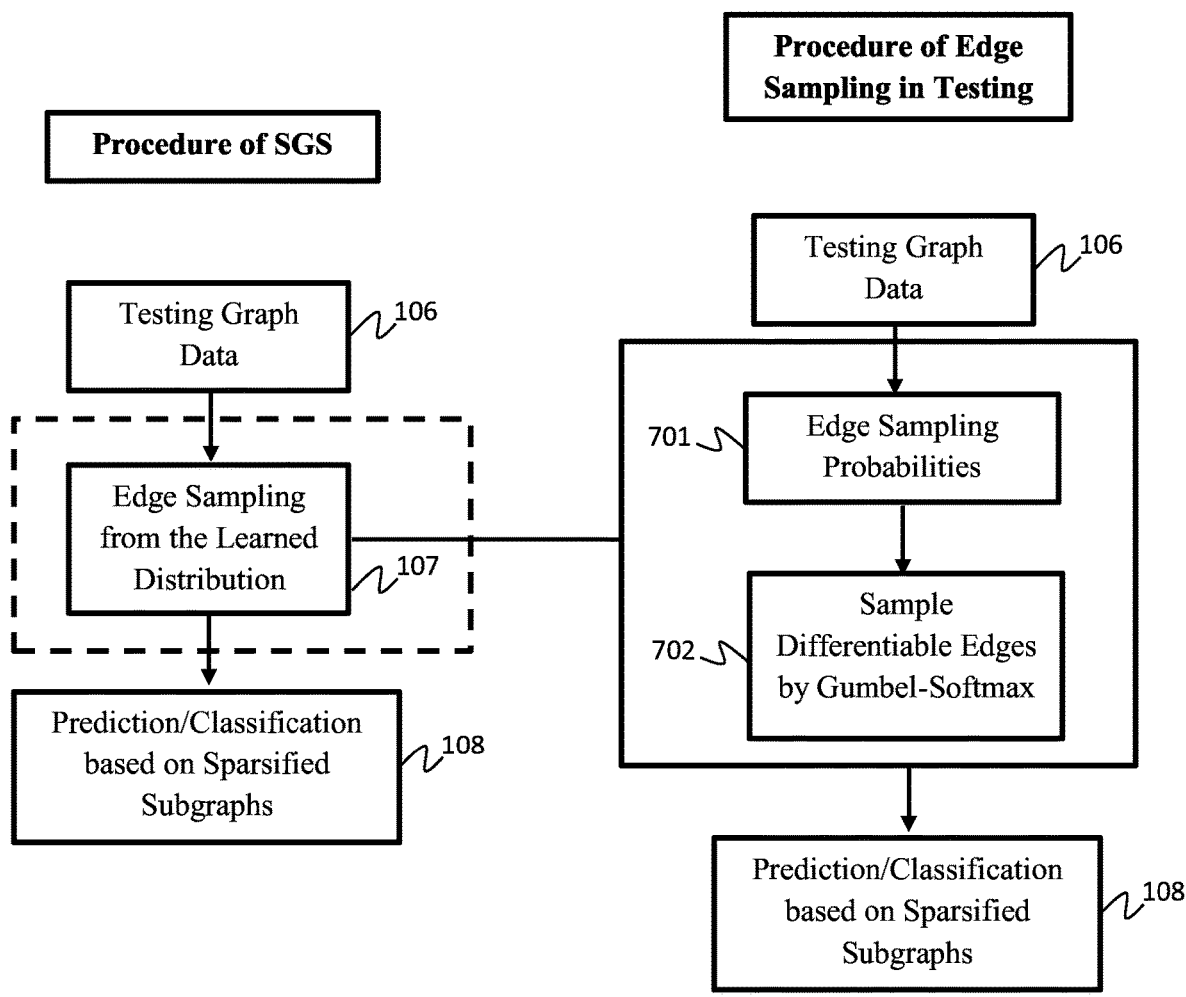
FIG. 6 is a block/flow diagram of an exemplary procedure for edge sampling in testing, in accordance with embodiments of the present invention.

FIG. 6 is a block/flow diagram of an exemplary procedure for edge sampling in testing, in accordance with embodiments of the present invention.

At block 701, regarding the edge sampling probabilities, given an input testing graph, SGS computes edge sampling probabilities as discussed in block 201 using the learned θ.

At block 702, regarding sample edges by Gumbel-Softmax, in the testing phase, the exemplary methods sample edges from individual nodes' as discussed in block 202. The output of this step is a sparsified subgraph for the input testing graph.

Figure 7:
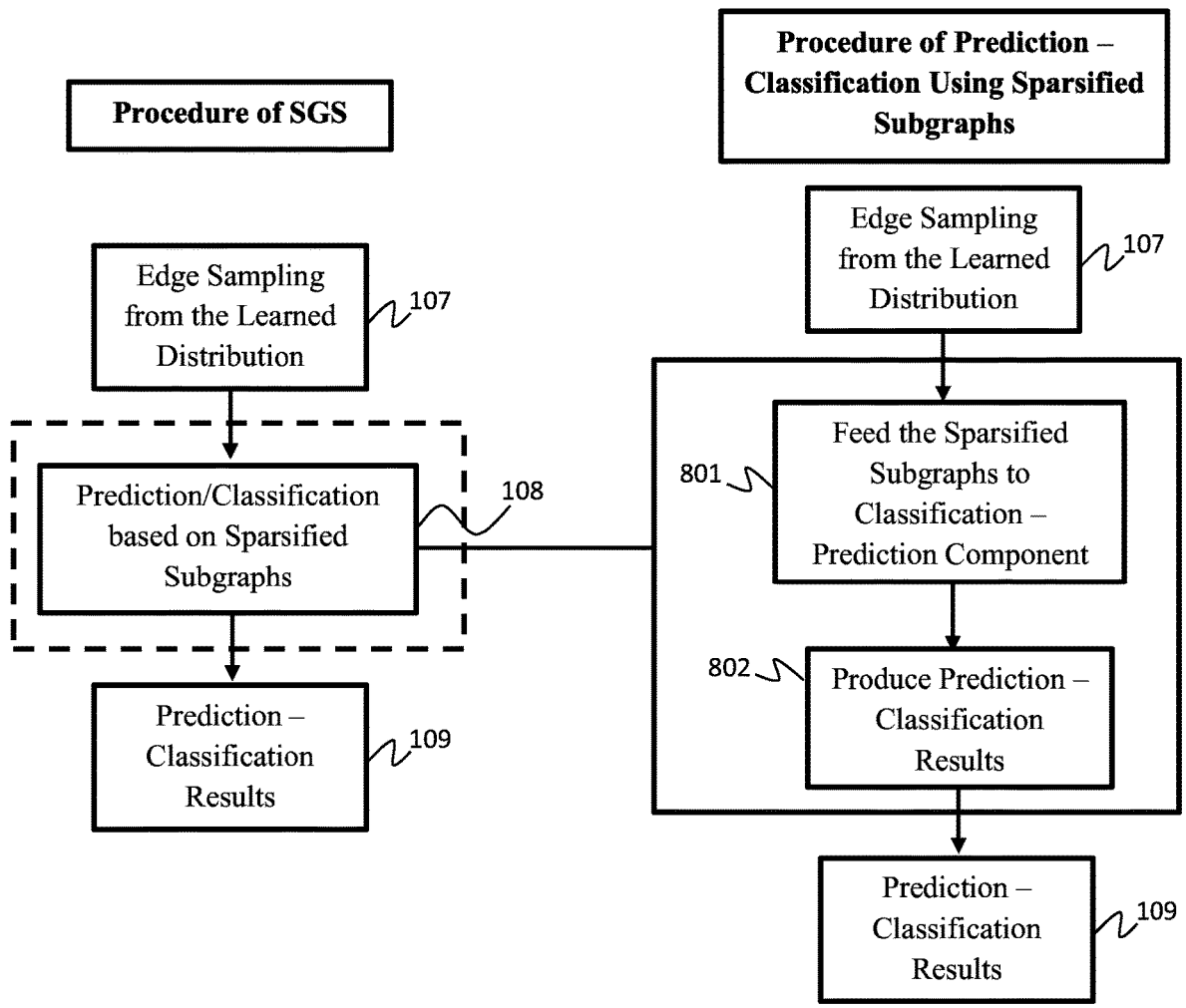
FIG. 7 is a block/flow diagram of an exemplary procedure for prediction/classification using sparsified subgraphs, in accordance with embodiments of the present invention.

FIG. 7 is a block/flow diagram of an exemplary procedure for prediction/classification using sparsified subgraphs, in accordance with embodiments of the present invention.

At block 801, the sparsified subgraphs are fed into prediction/classification components. As discussed in block 301, the exemplary method feeds the sparsified subgraphs to the prediction/classification component mentioned in block 301.

At block 802, the prediction/classification results are produced. The prediction/classification components take the sparsified subgraphs as input, and produce prediction/classification results. Note that the output from block 802 goes to block 109 where end users can visualize the output using various visualization tools.

Therefore, the exemplary embodiments of the present invention identify a Neural Sparsification (NeuralSparse) network, a general framework that simultaneously learns graph sparsification and graph representation by feedback signals from downstream tasks. The NeuralSparse network includes two components, that is, a sparsification network and one or more GNNs. For the sparsification network, the exemplary method utilizes a deep neural network to parameterize the sparsification process, that is, how to select edges from one-hop neighborhood given a fixed budget. In the training phase, the network learns to optimize a sparsification strategy that favors downstream tasks. In the testing phase, the network sparsifies input graphs following the learned strategy, instead of sampling subgraphs from a predefined distribution.

Unlike conventional sparsification techniques, the present exemplary technique takes both structural and non-structural information as input and optimizes the sparsification strategy by feedback from downstream tasks, instead of using (possibly irrelevant) heuristics. For the GNN component, the NeuralSparse network feeds the sparsified graphs to a GNN and learns a graph representation for subsequent prediction tasks. Under the framework of NeuralSparse, the method is able to leverage the standard stochastic gradient descent and backpropagation techniques to simultaneously optimize graph sparsification and representation.

The following description starts with the notations that are frequently used and then the theoretical justification behind NeuralSparse is described, as well as the architecture to tackle the supervised node classification problem.

In the exemplary embodiments of the present invention, an input graph of n nodes is represented as G=(V, E, A): (1) $V \in \mathbb{R}^{n \times d_n}$, which includes node features with dimensionality $d_n$; (2) $E \in \mathbb{R}^{n \times n}$, as well as a binary matrix where E(u, v)=1, if there is an edge between node u and node v, and (3) $A \in \mathbb{R}^{n \times n \times d_e}$ encodes input edge features of dimensionality $d_e$.

In addition, the method employs Y to denote the prediction target in downstream tasks (e.g., $Y \in \mathbb{R}^{n \times d_l}$) if the exemplary method is dealing with a node classification problem with $d_l$ classes).

From the perspective of statistical learning, the key of a defined prediction task is to learn P(Y|G), where Y is the prediction target and G is an input graph. Instead of directly working with original graphs, the exemplary method leverages sparsified subgraphs to mitigate overfitting risks.

In other words, the method is interested in the following variant, $$P(Y|G) \approx \sum_{g \in \mathbb{S}_G} P(Y|g)P(g|G), \qquad (1)$$

where g is a sparsified subgraph, and $\mathbb{S}_G$ is a class of sparsified subgraphs of G.

In general, because of the combinatorial complexity in graphs, it is intractable to enumerate all possible g as well as estimate the exact values of P(Y|g) and P(g|G).

Therefore, the method approximates the distributions by tractable functions, $$\sum_{g \in \mathbb{S}_G} P(Y|g)P(g|G) \approx \sum_{g \in \mathbb{S}_G} Q_\theta(Y|g)Q_\phi(g|G) \qquad (2)$$

where θ and φ are parameters of $Q_\theta$ and $Q_\phi$, respectively.

Moreover, to make the above graph sparsification process differentiable, the method employs reparameterization techniques to make $Q_\phi(g|G)$ directly generate differentiable samples, such that:

$$\sum_{g \in \mathbb{S}_G} Q_\theta(Y|g)Q_\phi(g|G) \propto \sum_{g' \sim Q_\phi(g|G)} Q_\theta(Y|g') \qquad (3)$$

where $g' \sim Q_\phi(g|G)$ means g' is a random sample drawn from $Q_\phi(g|G)$.

To this end, the key is how to find appropriate approximation functions: $Q_\phi(g|G)$ and $Q_\theta(Y|g)$.

In the exemplary embodiments of the present invention, a Neural Sparsification (NeuralSparse) network is employed to implement the theoretical framework discussed in Equation 3.

Figure 8:
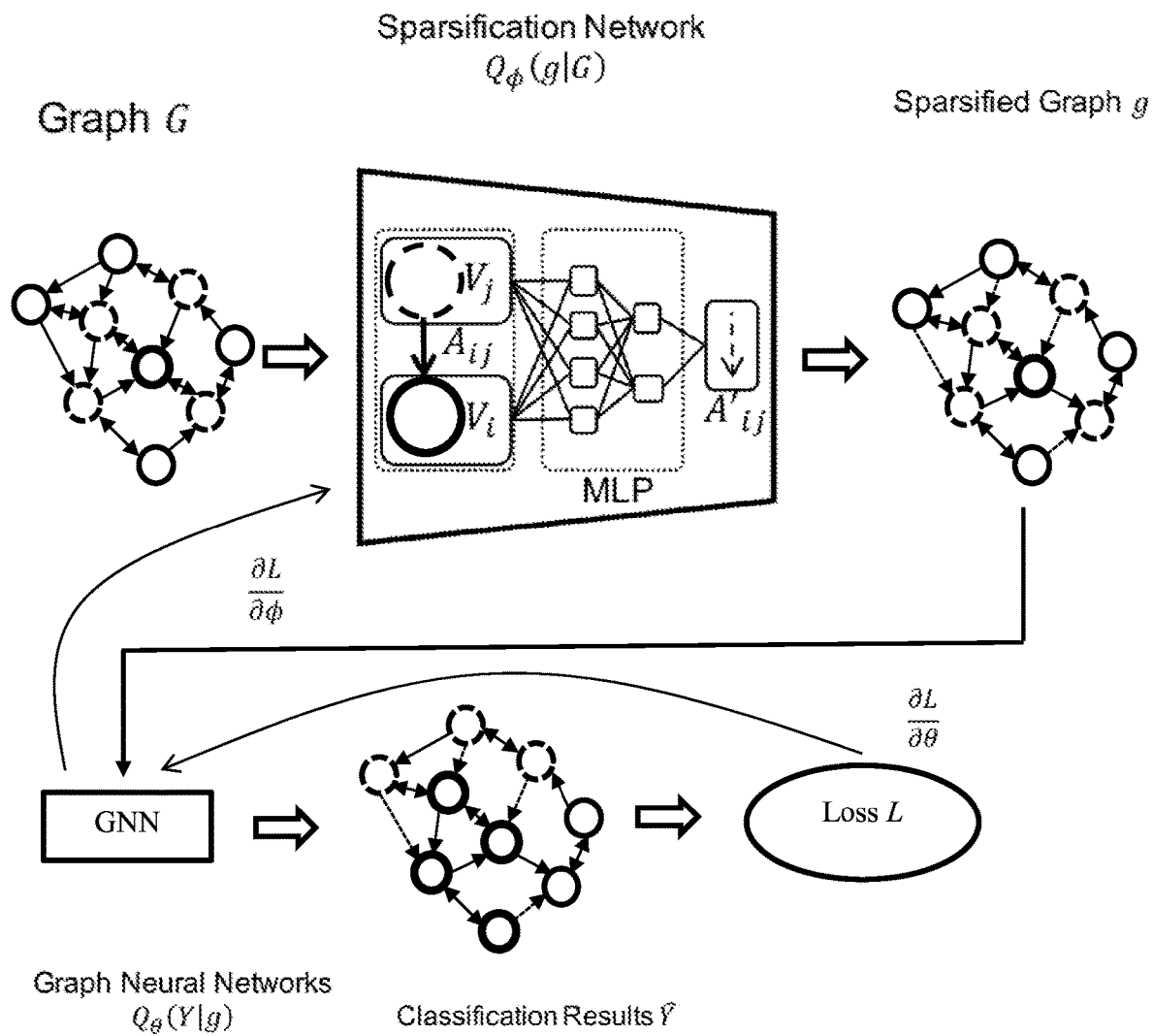
FIG. 8 is a block/flow diagram of an exemplary Neural-Sparse network, in accordance with embodiments of the present invention.

As shown in FIG. 8, the NeuralSparse network includes two components, that is, a sparsification network and Graph Neural Networks (GNNs).

The sparsification network is a multi-layer neural network that implements $Q_\phi(g|G)$. Taking G as input, the sparsification network generates a random sparsified subgraph of G drawn from a learned distribution.

GNNs implement $Q_\theta(Y|g)$ that takes a sparsified subgraph as input, extracts node representations, and makes predictions for downstream tasks.

As the sparsified subgraph samples are differentiable, the two components can be jointly trained using gradient descent based backpropagation techniques from a supervised loss function, as illustrated in Algorithm 1.

| Algorithm 1 Training algorithm for NeuralSparse |
|---|
| Input: graph G = (V, E, A), integer l, and training labels Y. |
| 1:   while stop criterion is not met do |
| 2:     Generate sparsified subgraphs $\{g_1, g_2, \ldots, g_l\}$ by sparsification network (Section 4); |
| 3:     Produce prediction $\{\hat{Y}_1, \hat{Y}_2, \ldots, \hat{Y}_l\}$ by feeding $\{g_1, g_2, \ldots, g_l\}$ into GNNs; |
| 4:     Calculate loss function J; |
| 5:     Update φ and θ by descending J |
| 6:   end while |

Regarding the sparsification network, following the theory discussed above, the goal of the sparsification network is to generate sparsified subgraphs for input graphs, serving as the approximation function $Q_\phi(g|G)$. Therefore, the exemplary method needs to answer the following questions in sparsification network. What is $\mathbb{S}_G$ in Equation 1, the class of subgraphs the method focuses on? How to sample sparsified subgraphs? How to make sparsified subgraph sampling process differentiable for the end-to-end training?

In the following, the present invention addresses such questions.

k-neighbor subgraphs. The exemplary method focuses on k-neighbor subgraphs for $\mathbb{S}_G$. Given an input graph, each node of a k-neighbor subgraph can select no more than k edges from its one-hop neighborhood. Although the concept of sparsification network is not limited to a specific class of subgraphs, the exemplary method selects k-neighbor subgraphs for the following reasons.

The exemplary method is able to make trade-offs between model accuracy and graph complexity by tuning the hyper-parameter k. Intuitively, when k is smaller, aggregation complexity in GNNs becomes smaller with less overfitting risk, but meanwhile the model prediction capability could be also lower as less structural information is preserved. It could be difficult to set a golden hyper-parameter that works all time, but a user always has the freedom to choose the k that is the best fit for a specific task.

k-neighbor subgraphs are friendly to parallel computation. As each node selects its edges independently from its neighborhood, the exemplary method can utilize tensor operations in existing deep learning frameworks, such as tensor flow, to speed up the sparsification process.

Regarding sampling k-neighbor subgraphs, given k and an input graph G=(V, E, A), the method obtains a k-neighbor subgraph by repeatedly sampling edges for each node in the original graph. Without loss of generality, the method sketches this sampling process by focusing on a specific node u in graph G.

Let $N_u$ be the set of one-hop neighbors of node u.

$v \sim f\varphi(V(u), V(Nu), A(u))$, where $f\varphi(\cdot)$ is a function that generates a one-hop neighbor v from the learned distribution based on node u's attributes, node attributes of u's neighbors $V(\mathbb{N}_u)$, and their edge attributes $A(u)$. In particular, the learned distribution is encoded by parameters $\varphi$.

Edge $E(u, v)$ is selected for node u.

The above two steps are repeated k times.

Note that the above process performs sampling without replacement. Given a node u, each of its adjacent edges is selected at most once. Moreover, the sampling function $f\varphi(\cdot)$ is shared among nodes, and, therefore, the number of parameters $\varphi$ is independent of the input graph size.

Regarding making samples differentiable, while conventional methods are able to generate discrete samples, these samples are not differentiable such that it is difficult to utilize them to optimize sample generation. To make samples differentiable, the exemplary method introduces a Gumbel-Softmax based multi-layer neural network to implement the sampling function $f\varphi(\cdot)$ discussed in above.

To make the discussion self-contained, the present invention briefly describes the idea of Gumbel-Softmax. Gumbel-Softmax is a reparameterization technique used to generate differentiable discrete samples. Under appropriate hyper-parameter settings, Gumbel-Softmax is able to generate continuous vectors that are as "sharp" as one-hot vectors widely used to encode discrete data.

Without loss of generality, the exemplary methods focus on a specific node u in a graph $G=(V, E, A)$.

Let $\mathbb{N}_u$ be the set of one-hop neighbors of node u.

The method implements $f\varphi(\cdot)$ as follows.

$$\forall v \in \mathbb{N}_u, z_{u,v} = MLP_\phi(V(u), V(v), A(u,v)), \quad (4)$$

where $MLP_\varphi$ is a multi-layer neural network with parameters $\varphi$.

$\forall v \in \mathbb{N}_u$, the method employs a softmax function to compute the probability to sample the edge, $$\pi_{u,v} = \frac{\exp(z_{u,v})}{\sum_{w \in \mathbb{N}_u} \exp(z_{u,w})} \quad (5)$$

Using Gumbel-Softmax, the method generates differentiable samples:

$$x_{u,v} = \frac{\exp((\log(\pi_{u,v}) + \varepsilon_v)/\tau)}{\sum_{w \in \mathbb{N}_u} \exp((\log(\pi_{u,w}) + \epsilon_w)/\tau)} \quad (6)$$

where $x_{u,v}$ is a scalar, $\epsilon_v = -\log(-\log(s))$ with s randomly drawn from Uniform(0, 1), and $\tau$ is a hyper-parameter called temperature, which controls the interpolation between discrete distribution and continuous categorical densities.

Note that when the method samples k edges, the computation for $z_{u,v}$ and $\pi_{u,v}$ only needs to be performed once.

For the hyper-parameter $\tau$, the method discusses how to tune it as follows.

Regarding discussion on temperature tuning, the behavior of Gumbel-Softmax is governed by a hyperparameter $\tau$ called temperature. In general, when $\tau$ is small, the Gumbel-Softmax distribution resembles the discrete distribution, which induces strong sparsity. However, small $\tau$ also introduces high variance gradient that blocks effective back-propagation. A high value of $\tau$ cannot produce the expected sparsification effect.

The exemplary embodiments adopt a strategy by starting the training with a high temperature and anneal to a small value with a guided schedule.

Regarding a sparsification algorithm and its complexity, for the ease of presentation, the exemplary method sketches the full algorithm of the sparsification network in a combinatorial manner.

As shown in Algorithm 2, given hyperparameter k, the sparsification network visits each node's one-hop neighbors k times.

Let m be the total number of edges in the graph. The complexity of sampling subgraphs by the sparsification network is O(km). When k is small in practice, the overall complexity is O(m).

---

Algorithm 2 Sampling subgraphs by sparsification network

Input: graph $G = (V, E, A)$ and integer k.
1:    Edge set $\mathbb{R} = \emptyset$
2:    for $u \in \mathbb{V}$ do
3:       for $v \in \mathbb{N}_u$ do
4:          $z_{u,v} =\leftarrow MLP_\phi(V(u), V(v), A(u, v))$
5:       end for
6:       for $v \in \mathbb{N}_u$ do
7:          $\pi_{u,v} \leftarrow \exp(z_{u,v})/\Sigma_{w \in \mathbb{N}_u} \exp(z_{u,w})$
8:       end for
9:       for $j = 1, \ldots, k$ do
10:         for $v \in \mathbb{N}_u$ do
11:            $x_{u,v} \leftarrow \exp((\log(\pi_{u,v}) + \epsilon_v)/\tau)/\Sigma_{w \in \mathbb{N}_u} \exp((\log(\pi_{u,w}) + \epsilon_w)/\tau)$
12:         end for
13:         Add the edge represented by vector $[x_{u,v}]$ into $\mathbb{R}$
14:       end for
15:    end for

---

Unlike conventional methods that incorporate layer-wise node samplers to reduce the complexity of GNNs, Neural-Sparse samples subgraphs before applying GNNs. In contrast to conventional methods, the NeuralSparse is parameterized and jointly trained with downstream GNNs. As for the computation complexity, the sparsification in Neural-Sparse is friendlier to parallel computation than the layer-conditioned approach in conventional methods. Compared with Graph Attention Models, the NeuralSparse can produce a sparser neighborhood, which effectively mitigates overfitting risks.

Figure 9:
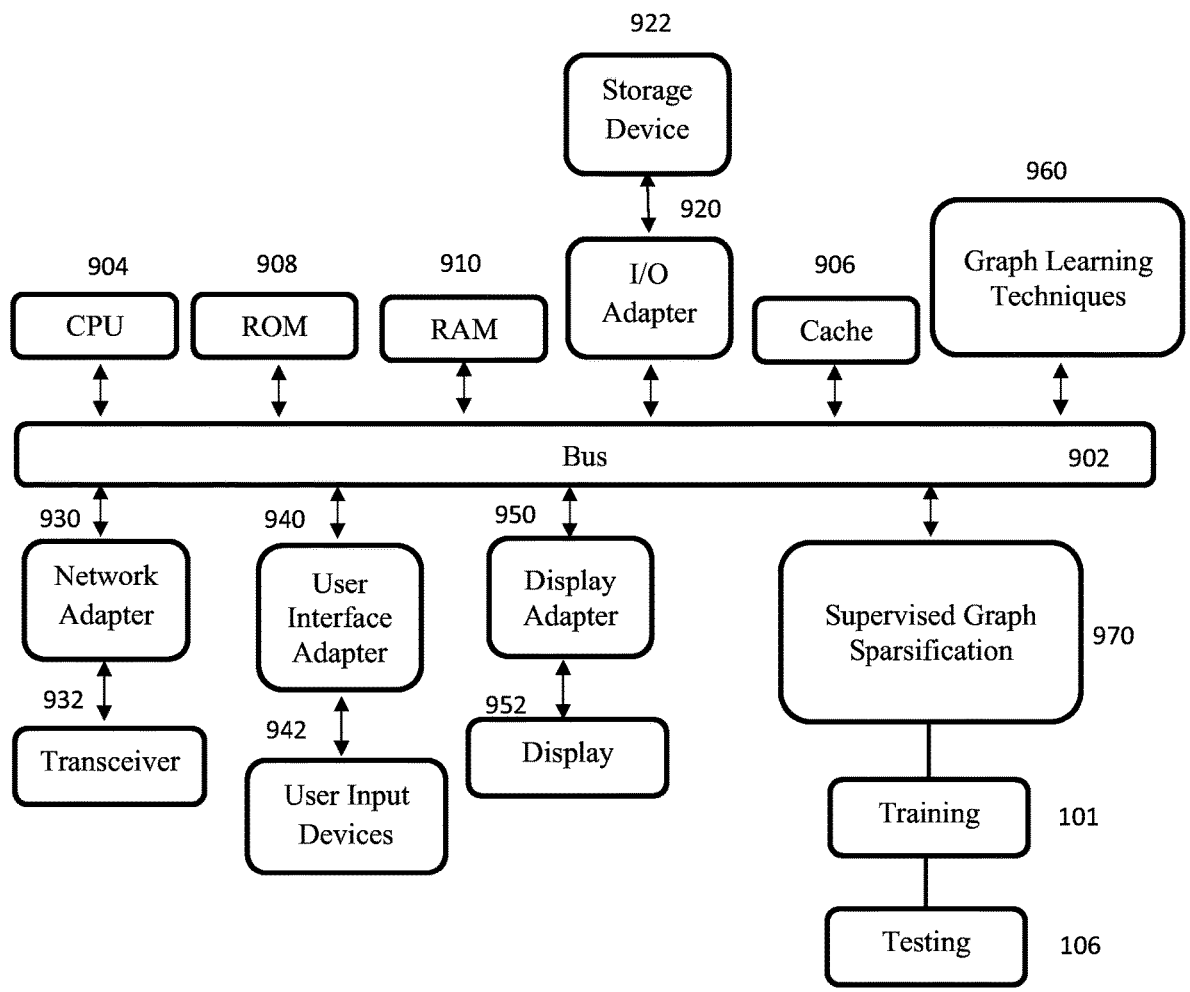
FIG. 9 is block/flow diagram of an exemplary processing system for supervised graph sparsification where feedback is utilized from subsequent graph learning tasks to guide graph sparsification, in accordance with embodiments of the present invention.

FIG. 9 is block/flow diagram of an exemplary processing system for supervised graph sparsification where feedback is utilized from subsequent graph learning tasks to guide graph sparsification, in accordance with embodiments of the present invention.

The processing system includes at least one processor or processor device (CPU) 904 operatively coupled to other components via a system bus 902. A cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Graph learning techniques 960 can be employed via the bus 902. The graph learning techniques 960 can employ a supervised graph sparsification 970 technique by utilizing a training phase 101 and a testing phase 106.

A storage device 922 is operatively coupled to system bus 902 by the I/O adapter 920. The storage device 922 can be any of a disk storage device (e.g., a magnetic or optical disk storage device), a solid state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 10:
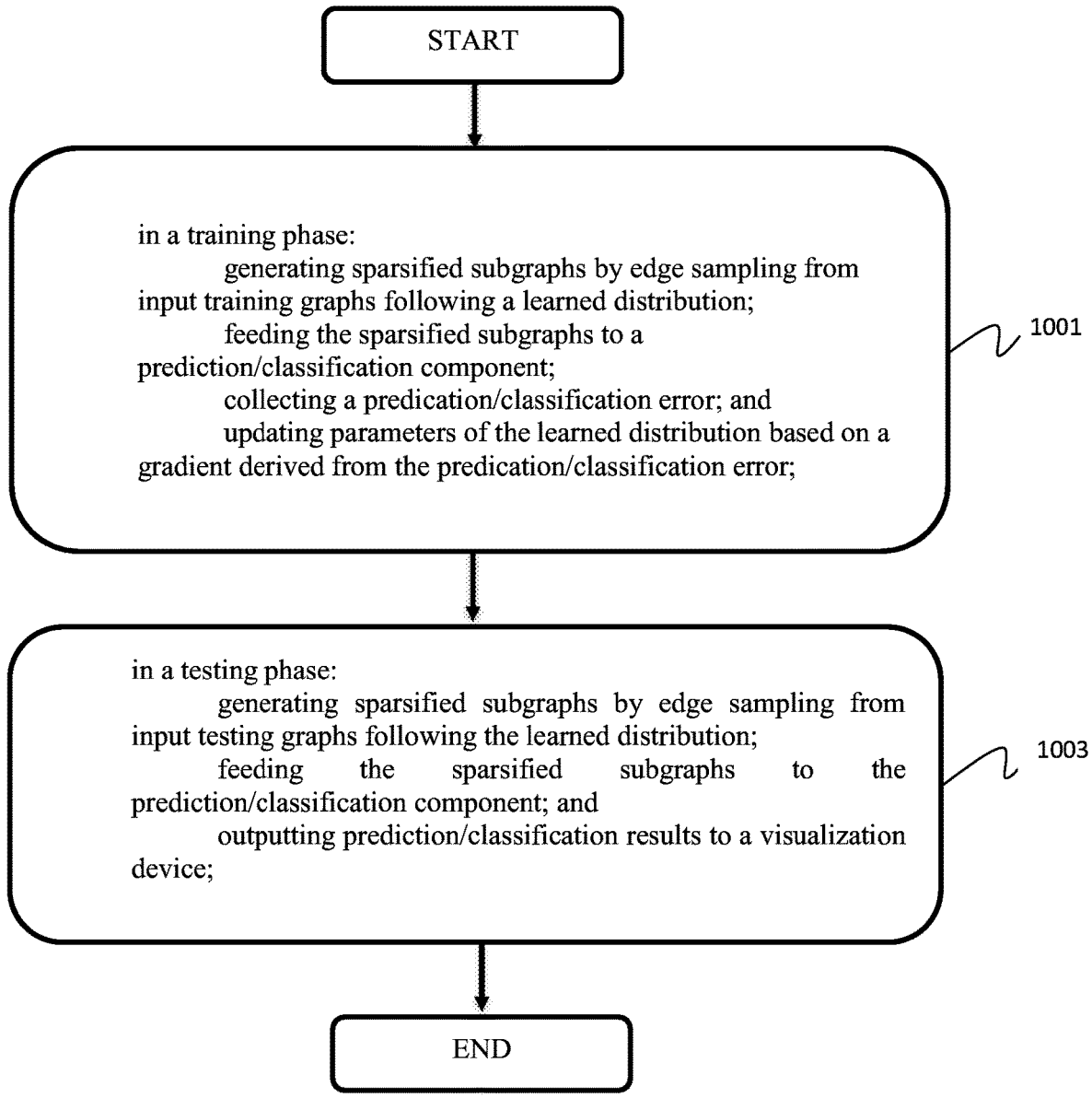
FIG. 10 is a block/flow diagram of an exemplary method for supervised graph sparsification where feedback is utilized from subsequent graph learning tasks to guide graph sparsification, in accordance with embodiments of the present invention.

FIG. 10 is a block/flow diagram of an exemplary method for supervised graph sparsification where feedback is utilized from subsequent graph learning tasks to guide graph sparsification, in accordance with embodiments of the present invention.

At block 1001, in a training phase, the process includes generating sparsified subgraphs by edge sampling from input training graphs following a learned distribution, feeding the sparsified subgraphs to a prediction/classification component, collecting a predication/classification error, and updating parameters of the learned distribution based on a gradient derived from the predication/classification error.

At block 1003, in a testing phase, the process includes generating sparsified subgraphs by edge sampling from input testing graphs following the learned distribution, feeding the sparsified subgraphs to the prediction/classification component, and outputting prediction/classification results to a visualization device.

FIG. 11 is a block/flow diagram of exemplary equations employed in methods for supervised graph sparsification where feedback is utilized from subsequent graph learning tasks to guide graph sparsification, in accordance with embodiments of the present invention.

Equations 1100 identify the importance of an edge, as well as a probability that the edge will be sampled.

In summary, the exemplary embodiments of the present invention identify a Neural Sparsification (NeuralSparse) network to address the overfitting issues brought by the complexity in real-life large graphs. NeuralSparse includes two components, that is, the sparsification network, which sparsifies input graphs by sampling edges following a learned distribution and GNNs, which take sparsified subgraphs as input and extract node representations for downstream tasks. The two components in NeuralSparse can be jointly trained with supervised loss, gradient descent, and backpropagation techniques.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for employing a supervised graph sparsification (SGS) network to use feedback from subsequent graph learning tasks to guide graph sparsification, the method comprising:
   in a training phase:
      generating sparsified subgraphs by edge sampling from input training graphs following a learned distribution;
      feeding the sparsified subgraphs to a prediction/classification component;
      collecting a predication/classification error; and
      updating parameters of the learned distribution based on a gradient derived from the predication/classification error; and
   in a testing phase:
      generating sparsified subgraphs by edge sampling from input testing graphs following the learned distribution;
      feeding the sparsified subgraphs to the prediction/classification component; and
      outputting prediction/classification results to a visualization device:
      wherein the edge sampling from the input training graphs includes:
      determining edge sampling probabilities; and
      sampling differentiable edges by Gumbel-Softmax: and
      wherein an importance of an edge is given by:

$$z_{u,v} = MLP_\theta(x_u, x_v, e_{u,v}),$$

where $z_{u,v}$ is a scalar indicating an importance of edge (u, v), $x_u$ is a vector representation of u's attributes, $x_v$ is a vector representation of v's attributes, $e_{u,v}$ is a vector representation of edge attributes, and $MLP_\theta(\ )$ is a multi-layer neural network parameterized by $\theta$.

2. The method of claim 1, wherein a probability that the edge (u, v) is sampled is given by:

$$\pi_{u,v} = \frac{\exp(z_{u,v})}{\sum_{w \in N_u} \exp(z_{u,w})}.$$

3. The method of claim 2, wherein the differentiable edge sampling by the Gumbel-Softmax provides a sparse vector is given by:

$$s_v = \frac{\exp((\log(\pi_{u,v}) + \varepsilon_v)/\tau)}{\sum_{w \in N_u} \exp((\log(\pi_{u,w}) + \varepsilon_w)/\tau)}$$

where $\tau$ is a constant and $s_v$ is expected to be either close to 0 or 1 with $\Sigma_{v \in N_u} s_v = 1$.

4. The method of claim 1, wherein the sparsified subgraphs are fed into graph neural networks (GNNs) to learn a graph representation for subsequent prediction components.

5. The method of claim 4, wherein the sparsified subgraphs are k-neighbor subgraphs.

6. The method of claim 5, wherein the sparsified subgraphs are sampled before applying the GNNs.

7. The method of claim 1, wherein samples from the edge sampling from input training and testing graphs are differentiable.

8. A non-transitory computer-readable storage medium comprising a computer-readable program for employing a supervised graph sparsification (SGS) network to use feedback from subsequent graph learning tasks to guide graph sparsification, wherein the computer-readable program when executed on a computer causes the computer to perform the steps of:
in a training phase:
generating sparsified subgraphs by edge sampling from input. training graphs following a learned distribution;
feeding the sparsified subgraphs to a prediction/classification component;
collecting a predication/classification error; and
updating parameters of the learned distribution based on a gradient derived from the predication/classification error; and
in a testing phase:
generating sparsified subgraphs by edge sampling from input testing graphs following the learned distribution;
feeding the sparsified subgraphs to the prediction/classification component; and
outputting prediction/classification results to a visualization device;
wherein the edge sampling from the input training graphs includes:
determining edge sampling probabilities; and
sampling differentiable edges by Gumbel-Softmax; and
wherein an importance of an edge is given by:

$z_{u,v} = MLP_\theta(x_u, x_v, e_{u,v})$, where $z_{u,v}$ is a scalar indicating an importance of edge (u, v), $x_u$ is a vector representation of u's attributes, $x_v$ is a vector representation of v's attributes, $e_{u,v}$ is a vector representation of edge attributes, and $MLP_\theta(\ )$ is a multi-layer neural network parameterized by $\theta$.

9. The non-transitory computer-readable storage medium of claim 8, wherein a probability that the edge (u, v) is sampled is given by:

$$\pi_{u,v} = \frac{\exp(z_{u,v})}{\sum_{w \in N_u} \exp(z_{u,w})}.$$

10. The non-transitory computer-readable storage medium of claim 9, wherein the differentiable edge sampling by the Gumbel-Softmax provides a sparse vector is given by:

$$s_v = \frac{\exp((\log(\pi_{u,v}) + \varepsilon_v)/\tau)}{\sum_{w \in N_u} \exp((\log(\pi_{u,w}) + \varepsilon_w)/\tau)}$$

where $\tau$ is a constant and $s_v$ is expected to be either close to 0 or 1 with $\Sigma_{v \in N_u} s_v = 1$.

11. The non-transitory computer-readable storage medium of claim 8, wherein the sparsified subgraphs are fed into graph neural networks (GNNs) to learn a graph representation for subsequent prediction components.

12. The non-transitory computer-readable storage medium of claim 11, wherein the sparsified subgraphs are k-neighbor subgraphs.

13. The non-transitory computer-readable storage medium of claim 12, wherein the sparsified subgraphs are sampled before applying the GNNs.

14. The non-transitory computer-readable storage medium of claim 8, wherein samples from the edge sampling from input training and testing graphs are differentiable.

15. A system for employing a supervised graph sparsification (SGS) network to use feedback from subsequent graph learning tasks to guide graph sparsification, the system comprising:
a memory; and
one or more processors in communication with the memory configured to:
in a training phase:
generate sparsified subgraphs by edge sampling from input training graphs following a learned distribution;
feed the sparsified subgraphs to a prediction/classification component;
collect a predication/classification error; and
update parameters of the learned distribution based on a gradient derived from the predication/classification error; and
in a testing phase:
generate sparsified subgraphs by edge sampling from input testing graphs following the learned distribution;
feed the sparsified subgraphs to the prediction/classification component; and
output prediction/classification results to a visualization device;
wherein the edge sampling from the input training graphs includes determining edge sampling probabilities and sampling differentiable edges by Gumbel-Softmax; and wherein an importance of an edge is given by:

$$z_{u,v}=MLP_\theta(x_u, x_v, e_{u,v}),$$

where $z_{u,v}$ is a scalar indicating an importance of edge (u, v), $x_u$ is a vector representation of u's attributes, $x_v$ is a vector representation of v's attributes, $e_{u,v}$ is a vector representation of edge attributes, and $MLP_\theta(\ )$ is a multi-layer neural network parameterized by $\theta$.

* * * * *